Mar. 6, 1923.
C. SEYMOUR
TIMBER CUTTING APPARATUS
Filed Mar. 18, 1921
1,447,606
2 sheets-sheet 1
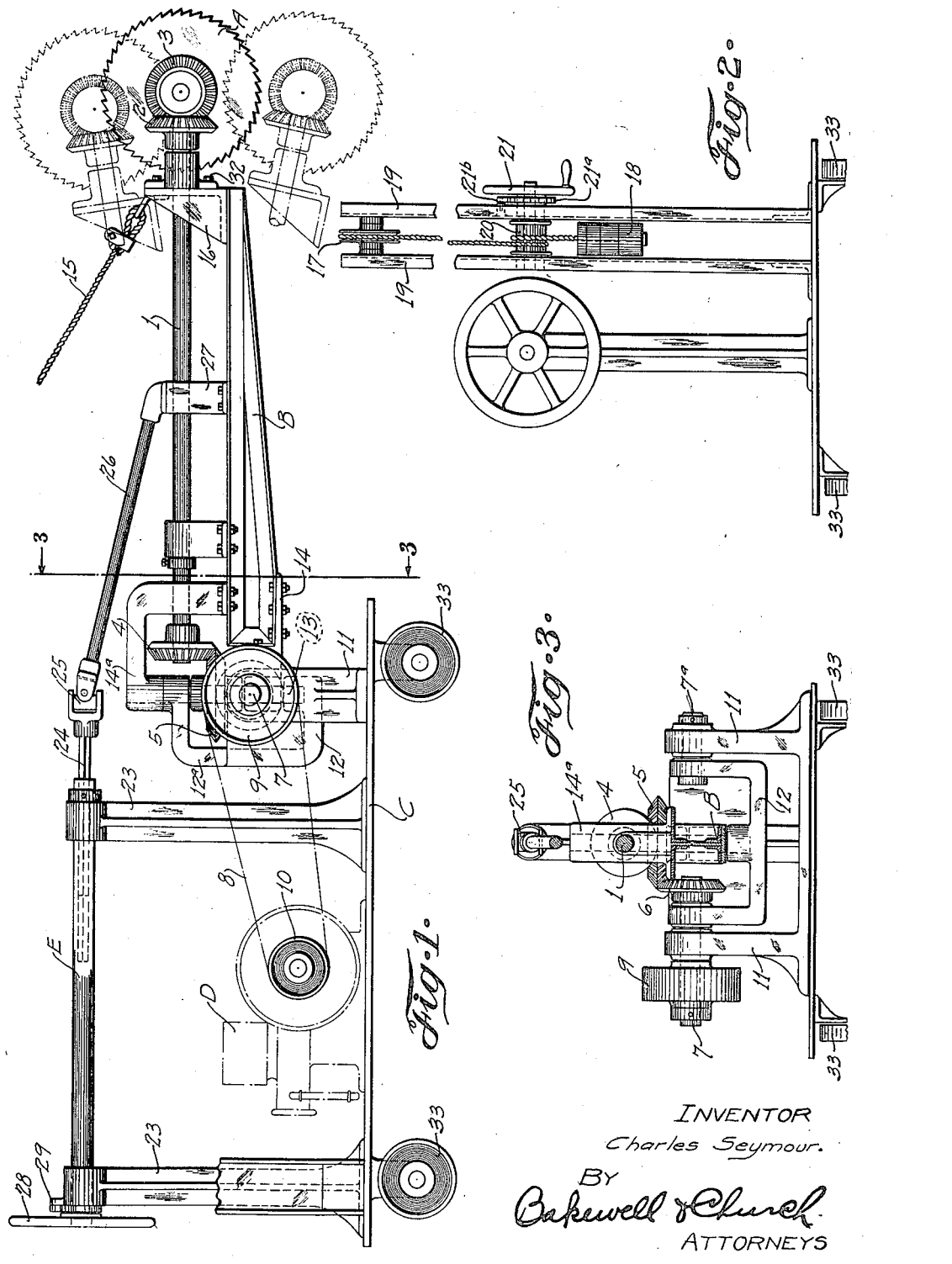
INVENTOR
Charles Seymour.
BY
Bakewell & Church
ATTORNEYS

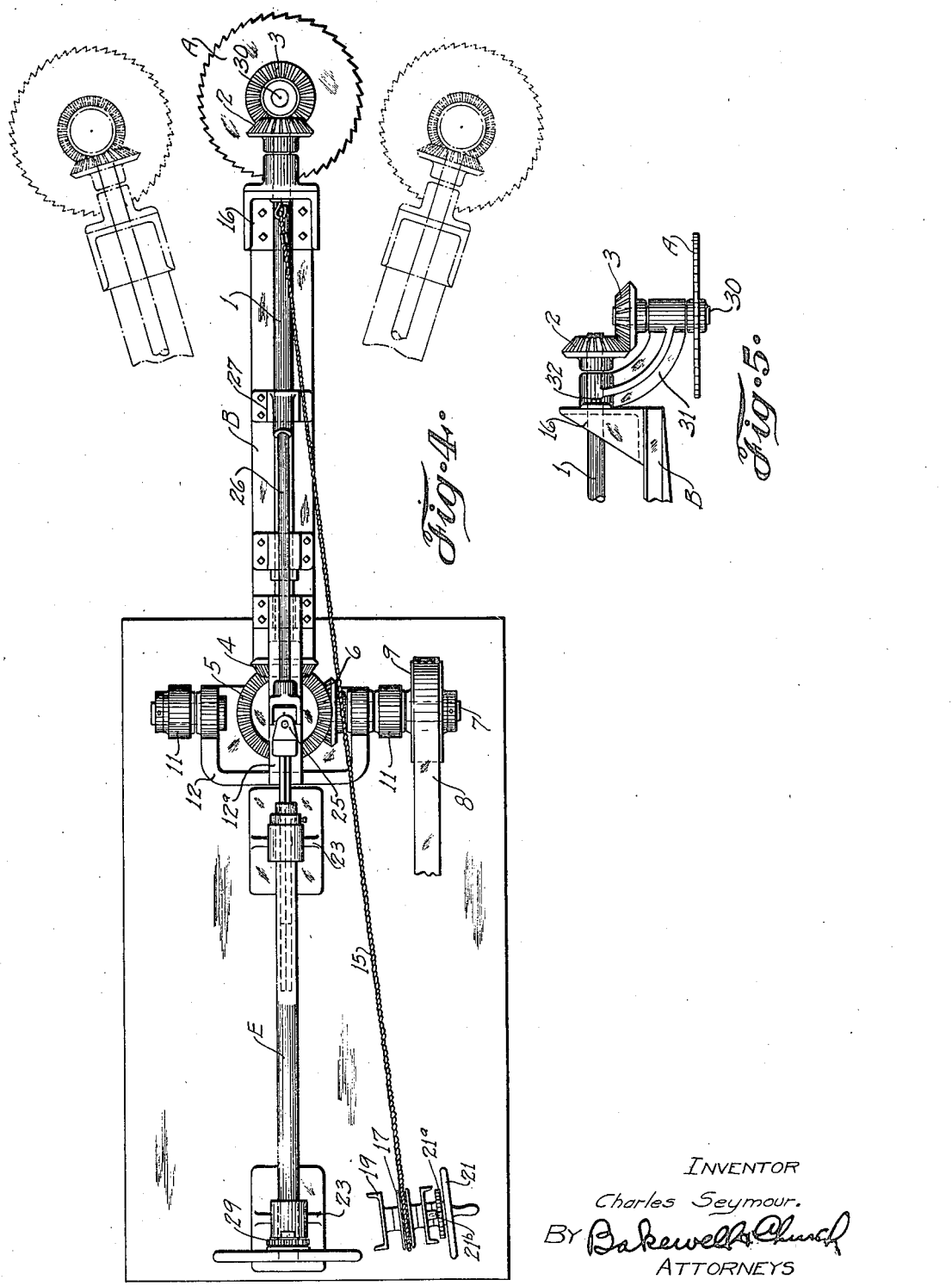

Patented Mar. 6, 1923.

1,447,606

UNITED STATES PATENT OFFICE.

CHARLES SEYMOUR, OF ST. LOUIS, MISSOURI.

TIMBER-CUTTING APPARATUS.

Application filed March 18, 1921. Serial No. 453,275.

*To all whom it may concern:*

Be it known that I, CHARLES SEYMOUR, a citizen of the United States, residing at St. Louis, Missouri, have invented a certain new and useful Improvement in Timber-Cutting Apparatus, of which the following is a full, clear, and exact description, such as will enable others skilled in the art to which it appertains to make and use the same.

This invention relates to apparatus of the kind that is used for sawing timber.

One object of the invention is to provide a machine of simple construction that can be used for sawing down standing timber, namely, trees, and also for removing the large limbs or branches from a tree lying on the ground and for cutting the trunk of the tree into short lengths.

Another object is to provide a portable timber sawing machine that can be moved easily from place to place and which is so constructed that the operator in charge of the machine can easily govern the movement of the saw to feed it through the work.

And still another object is to provide a timber sawing apparatus in which a circular saw is adjustably mounted on a saw carrier that can be moved in a plurality of directions so as to bring the saw into engagement with the work without moving or changing the position of the base portion of the machine on which the saw operating mechanism is mounted.

To this end I have devised a timber sawing apparatus which comprises a circular saw, a means for rotating said saw and a carrier for said saw constructed in such a manner that it can be moved both horizontally and vertically so as to bring the saw into position to act on the work and to feed the saw through the work. The saw is preferably mounted in such a manner that it can be arranged either in a position to form a vertical cut or in a position to form a horizontal cut, and means is provided whereby the operator in charge of the machine can easily actuate or control the position of the saw carrier. The machine preferably comprises a portable base to which the saw carrier is joined by a universal connection that permits said carrier to be swung horizontally and vertically, and an internal combustion engine or other suitable motor is mounted on said base so as to drive or operate the mechanism that rotates the saw.

Figure 1 of the drawings is a side elevational view of a timber sawing apparatus constructed in accordance with my invention.

Figure 2 is an end view of said apparatus.

Figure 3 is a vertical transverse sectional view, taken on the line 3—3 of Figure 1, looking in the direction indicated by the arrows.

Figure 4 is a top plan view of the parts shown in Figure 1 but with the saw arranged horizontally; and Figure 5 is a detail view illustrating how the saw can be adjusted so as to arrange it either in a vertical position or in a horizontal position.

Referring to the drawings which illustrate the preferred form of my invention, A designates a circular saw that is mounted on a saw carrier B, and C designates a portable base or supporting structure on which the saw carrier B is mounted in such a manner that it can be swung horizontally and also vertically, the saw carrier projecting outwardly from said supporting structure.

Means is provided for rotating the saw A and in the form of my invention herein illustrated said means consists of a shaft 1 extending longitudinally of the saw carrier B and mounted in suitable bearings thereon, a beveled gear 2 at the front end of said shaft that meshes with a beveled gear 3 secured to the saw A and a beveled gear 4 on the rear end of the shaft 1 that meshes with a beveled gear 5, which in turn, meshes with a beveled gear 6 on a drive shaft 7. Rotary movement is imparted to the drive shaft 7 by a belt or other suitable driving device 8 that passes around a pulley 9 on the drive shaft 7 and a pulley 10 that is driven by an internal combustion engine D or other suitable motor, preferably mounted on the base plate C of the machine, as indicated in broken lines in Figure 1.

The saw carrier B is so mounted that it can be swung horizontally and vertically without disturbing the operative relationship between the gears 4, 5 and 6, and while this can be accomplished in various ways without departing from the spirit of my invention, I prefer to provide the base plate C with a pair of vertically-disposed standards 11 on which a frame member 12 is rockably mounted in such a manner that it can be oscillated about a horizontal axis. As shown in Figure 3, the frame member 12 is rockably mounted on the drive shaft 7 which is journaled in one of the standards 11 and on a stub shaft 7ª that is carried by the other standard 11. Said frame member 12 is provided with a yoke-shaped portion 12ª, shown in Figure 1, that carries a vertically-disposed shaft 13 shown in broken lines which serves as a vertical pivot or axis about which the saw carrier B can be swung horizontally, said saw carrier B being provided at its rear end with a bottom bearing 14 and a top bearing 14ª through which the vertically-disposed shaft 13 passes, and the idler 5 being mounted on said shaft 13. By moving the front end, the right hand end of the saw carrier B upwardly or downwardly, the frame member 12 will rock on the drive shaft 7 and on the stub shaft 7ª as an axis, thus causing the idler gear 5 to travel around the gear 6 on the drive shaft and remain in operative engagement with said gear 6. When the front end of the saw carrier B is swung horizontally either to the right or to the left, the gear 4 will travel around the idler gear 5 and remain in operative relationship with said gear 5. It will thus be seen that the saw carrier B is connected at one end to the supporting structure 11 on the base plate C by a universal connection which permits said saw carrier to be moved in an arc either horizontally or vertically when the saw A is in operation.

The free end of the saw carrier B is sustained preferably by a counterweighted mechanism consisting of a rope or cable 15 connected to a bracket 16 on the front end of the saw carrier and leading upwardly from same over a pulley 17 (see Figure 2), and thence downwardly to a weight 18. The pulley 17 is carried by a horizontally-disposed shaft supported by a pair of vertical uprights 19 on the base plate C of the machine and the cable 17 passes around a drum 20 on said uprights that is adapted to be rotated so as to wind the cable 15 onto and off of said drum, and thus raise and lower the free end of the saw carrier B. Preferably a manually-operable actuating mechanism 21 is provided for actuating the drum 20, which operating mechanism 21 comprises a pawl and ratchet 21ª and 21ᵇ for preventing the drum from accidentally turning in a direction to permit the free end of the saw carrier to swing downwardly. Means is provided for swinging the saw carrier B horizontally, and in the embodiment of my invention herein illustrated said means consists of a horizontally-disposed shaft E rotatably mounted in uprights 23 on the base plate C and provided with a slidable extension 24 that is connected by means of a universal joint 25 with a rod 26 whose front end is connected to a bracket or bearing 27 on the saw carrier B shown in Figure 1, said shaft E being provided at its rear end with a hand wheel 28 and also with a pawl and ratchet mechanism, indicated by the reference character 29 in Figure 1 for locking the shaft E in adjusted position. When the hand wheel 28 is turned in one direction the saw carrier and the saw A thereon will swing to the right, and when said hand wheel is turned in the opposite direction the saw carrier and saw will swing to the left.

The saw A is mounted on the saw carrier B in such a manner that it can be arranged either in a vertical position, as shown in Figure 1, or in a horizontal position, as shown in Figures 4 and 5. One convenient way of accomplishing this is to connect the saw A to a short shaft 30 which is journaled in a bearing on a curved arm 31 that is detachably connected by fastening devices 32 to the bracket 16 on the front end of the saw carrier B. When the saw A is to be arranged in a vertical position, as shown in Figure 1, the arm 31 is mounted on the bracket in such a manner that it projects horizontally from one side of said bracket, thus causing the shaft 30 of the saw to be arranged in a horizontal position at right angles to the shaft 1 of the saw operating mechanism. When it is desired to arrange the saw A in a horizontal position, as shown in Figures 4 and 5, the fastening devices 32 are first loosened so as to release the arm 31 and permit said arm to be arranged in the position shown in Figure 5, wherein it will be noted that the saw shaft 30 is disposed vertically at right angles to the shaft 1 which rotates the saw, and thereafter the fastening devices 32 are tightened so as to rigidly secure the arm 31 to the bracket 16.

If the machine is to be used for cutting down trees, the arm 31 which carries the saw A is mounted on the saw carrier B in such a manner that the saw will be disposed horizontally, as shown in Figure 5. The machine is then moved into proximity to the tree to be cut down and the engine or motor D is set in operation so as to impart rotary movement to the saw. During the sawing operation the hand wheel 28 of the shaft E is turned so as to swing the saw carrier B horizontally, as indicated by the dotted lines and full lines in Figure 4, and thus feed the saw through the work. After the tree has been felled the arm 31 which carries the saw is disconnected from the bracket 16 on the saw carrier and turned into such a position that the saw A will be disposed vertically and thereafter secured tightly to the bracket on the saw carrier. The engine or motor D is then set in operation and the saw carrier B is then rocked vertically, as indicated by the dotted and full lines in Figure 1, so as to feed the saw through the work, it being possible to use the machine for cutting off the large limbs of the tree and for cutting the trunk into short lengths. The base plate C of the machine is provided with wheels 33 so as to enable the machine to be moved easily from place to place, and as the saw is supported by a carrier B which is connected to a supporting structure on the base plate of the machine by a universal connection, it is possible to swing the carrier B in an arc so as to bring the saw into engagement with the work and feed the saw through the work without interfering with the operation of the mechanism that rotates the saw.

Having thus described my invention, what I claim as new and desire to secure by Letters Patent is:

1. A timber sawing apparatus, comprising a portable base, a horizontally-disposed, rigid saw carrier projecting outwardly from said base, a pair of spaced standards on said base, an oscillating frame member journaled in said standards in such a manner that it can be rocked about a horizontal axis, a vertically-disposed, yoke-shaped portion on said frame member provided with a vertical shaft, a portion at the rear end of said saw carrier rockably mounted on said shaft in such a manner that the free end of the saw carrier can be moved horizontally to the right and to the left, a circular saw on said saw carrier, an operating shaft for said saw journaled in bearings on said saw carrier, a beveled gear on said operating shaft, a horizontally-disposed drive shaft arranged in concentric relation with the axis about which said oscillating frame member is rocked, and an idler meshing with said gears and arranged in concentric relation with the vertical axis about which said saw carrier can be swung horizontally.

2. A timber sawing apparatus, comprising a portable base, a horizontally-disposed, rigid saw carrier projecting outwardly from said base, a pair of spaced standards on said base, an oscillating frame member journaled in said standards in such a manner that it can be rocked about a horizontal axis, a vertically-disposed, yoke-shaped portion on said frame member provided with a vertical shaft, a portion at the rear end of said saw carrier rockably mounted on said shaft in such a manner that the free end of the saw carrier can be moved horizontally to the right and to the left, a circular saw on said saw carrier, an operating shaft for said saw journaled in bearings on said saw carrier, a beveled gear on said operating shaft, a horizontally-disposed drive shaft arranged in concentric relation with the axis about which said oscillating frame member is rocked, an idler meshing with said gears and arranged in concentric relation with the vertical axis about which said saw carrier can be swung horizontally, a sustaining means for the free end of said saw carrier that is adapted to be operated to raise and lower said saw carrier, and a manually-operable means for swinging said carrier horizontally.

3. A timber sawing apparatus, comprising a portable base, a horizontally-disposed, rigid saw carrier projecting outwardly from said base, a pair of spaced standards on said base, an oscillating frame member journaled in said standards in such a manner that it can be rocked about a horizontal axis, a vertically-disposed, yoke-shaped portion on said frame member provided with a vertical shaft, a portion at the rear end of said saw carrier rockably mounted on said shaft in such a manner that the free end of the saw carrier can be moved horizontally to the right and to the left, a circular saw on said saw carrier, an operating shaft for said saw journaled in bearings on said saw carrier, a beveled gear on said operating shaft, a horizontally-disposed drive shaft arranged in concentric relation with the axis about which said oscillating frame member is rocked, an idler meshing with said gears and arranged in concentric relation with the vertical axis about which said saw carrier can be swung horizontally, a sustaining cable for said saw carrier, a winding mechanism for said cable, and means for swinging the saw carrier horizontally consisting of a horizontally-disposed, rotatable shaft provided with a slidable extension that is connected by means of a universal joint and a rod with said saw carrier.

CHARLES SEYMOUR.